(12) United States Patent
Lee

(10) Patent No.: US 7,918,261 B2
(45) Date of Patent: Apr. 5, 2011

(54) APPARATUS AND METHOD FOR ASSEMBLING LENS MODULE

(75) Inventor: Hsin-Ho Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 671 days.

(21) Appl. No.: 11/933,888

(22) Filed: Nov. 1, 2007

(65) Prior Publication Data

US 2008/0173393 A1   Jul. 24, 2008

(30) Foreign Application Priority Data

Jan. 18, 2007   (CN) .......................... 2007 1 0200074

(51) Int. Cl.
*B29C 65/14*   (2006.01)
(52) U.S. Cl. .................. 156/380.9; 156/379.6; 250/239
(58) Field of Classification Search ............... 156/272.2, 156/275.5, 275.7, 379.6, 380.9, 580; 250/239
See application file for complete search history.

(56) References Cited

U.S. PATENT DOCUMENTS

| 5,433,810 A * | 7/1995 | Abrams ...................... 156/273.7 |
| 2007/0096020 A1 * | 5/2007 | Mitsugi et al. ................ 250/239 |

FOREIGN PATENT DOCUMENTS

| CN | 2665731 Y | 12/2004 |
| CN | 1664639 A | 9/2005 |
| CN | 1685265 A | 10/2005 |
| CN | 2757096 Y | 2/2006 |
| CN | 1808199 A | 7/2006 |
| CN | 1892275 A | 1/2007 |
| JP | 2006-163006 A | 6/2006 |
| WO | WO2004049058 A1 | 6/2004 |
| WO | WO2004107006 A1 | 12/2004 |

* cited by examiner

*Primary Examiner* — Richard Crispino
*Assistant Examiner* — Daniel McNally
(74) *Attorney, Agent, or Firm* — Jeffrey T. Knapp

(57) ABSTRACT

An apparatus for assembling a lens module includes a UV light source and a pressing device. The lens modules each having a first component, a second component and UV curable adhesive applied between the first and second components. The UV light source is configured for emitting UV light toward the UV curable adhesive. The pressing device is configured for pressing the first components against the second components. A method for assembling a lens module is also included in the invention.

11 Claims, 5 Drawing Sheets

APPARATUS AND METHOD FOR ASSEMBLING LENS MODULE

BACKGROUND

1. Field of the Invention

The present invention relates to apparatuses for assembling lens module and, particularly to an apparatus and a method for assembling lens module.

2. Description of Related Art

With the ongoing development of microcircuitry and multimedia technology, digital cameras are now in widespread use. High-end portable electronic devices, such as mobile phones and PDAs (Personal Digital Assistants), are being developed to be increasingly multi-functional. Many of these portable electronic devices are now equipped with a digital camera module. The camera module generally includes a lens module. Basically, the lens module includes a lens barrel, at least a lens group, spacers, and an Infrared-cut (IR-cut) filter, etc.

Generally, an assembly method for a lens module includes:

Firstly, assembling a lens group into a lens barrel;

Secondly, placing a spacer into the lens barrel adjacent to the lens group, and applying ultraviolet (UV) curable adhesive between an inner surface of the lens barrel and an outer surface of the spacer;

Thirdly, applying a UV light irradiation onto the UV curable adhesive between the lens barrel and the spacer so as to fix the spacer to the lens barrel;

Fourthly, applying UV curable adhesive onto a top surface of the spacer and placing an IR-cut filter on the spacer with the UV curable adhesive sandwiched between the IR-cut filter and the spacer;

Finally, irradiating the UV light toward the UV curable adhesive so as to cure the UV curable adhesive between the spacer and the IR-cut filter, thus the IR-cut filter being fixed to the spacer.

However, during the curing process of the UV curable adhesive, the UV curable adhesive between the spacer and the lens barrel may expand in volume and cause deflection of the spacer relative to the lens barrel. Similarly, the expansion of the UV curable adhesive between the IR-cut filter and the lens barrel may cause deflection of the IR-cur filter. The above-mentioned problems may decrease optical performances of the lens module and the output thereof.

What is needed, therefore, is an apparatus and a method for assembling lens modules that can increase optical performances of the lens module and the production yield thereof.

SUMMARY

In a first present embodiment of the present invention, an apparatus for assembling a lens module includes a UV light source and a pressing device. The lens modules each having a first component, a second component and UV curable adhesive applied between the first and second components. The UV light source is configured for emitting UV light towards the UV curable adhesive. The pressing device is configured for pressing the first components against the second components.

In a second present embodiment of the present invention, an assembly method for assembling a lens module includes steps: providing a semi-finished lens module, the semi-finished lens module having a first component, a second component and UV curable adhesive applied between the first and second components; pressing the first component against the second component; and applying a UV light irradiation onto the UV curable adhesive so as to fix the first component to the second component.

In a third present embodiment of the present invention, an apparatus is used for assembling lens modules. The lens modules each has a first component, a second component and UV curable adhesive applied between the first and second components. The apparatus includes a UV light source, a UV light permeable plate, a tray and a plurality of adjusting clamps. The UV light source is configured for emitting UV light toward the UV curable adhesive. A plurality of pressing posts extends perpendicularly from the UV light permeable plate. The pressing posts is configured for pressing the first components against the second components. The tray faces toward the UV light permeable plate. The tray includes a plurality of receptacles for receiving the lens modules. the pressing posts extend toward and are aligned with the respective receptacles for pressing the lens modules received therein. The plurality of adjusting clamps each has a first clamping jaw and a second clamping jaw. The UV light permeable plate and the tray are disposed between the first and second clamping jaws. The adjusting clamps are configured for adjusting a distance between the pressing posts and the tray.

Advantages and novel features will become more apparent from the following detailed description of the present apparatus for assembling lens modules, when taken in conjunction with the accompanying drawings.

BRIEF DESCRIPTION OF THE DRAWINGS

Many aspects of the present apparatus and method for assembling the lens module can be better understood with reference to the following drawings. The components in the drawings are not necessarily drawn to scale, the emphasis instead being placed upon clearly illustrating the principles of the present apparatus and method for assembling the lens modules. Moreover, in the drawings, like reference numerals designate corresponding parts throughout the several views.

DETAILED DESCRIPTION OF THE EMBODIMENT

Reference will now be made to the drawings to describe several embodiments of the apparatus and method for assembling lens modules.

Figure 1:
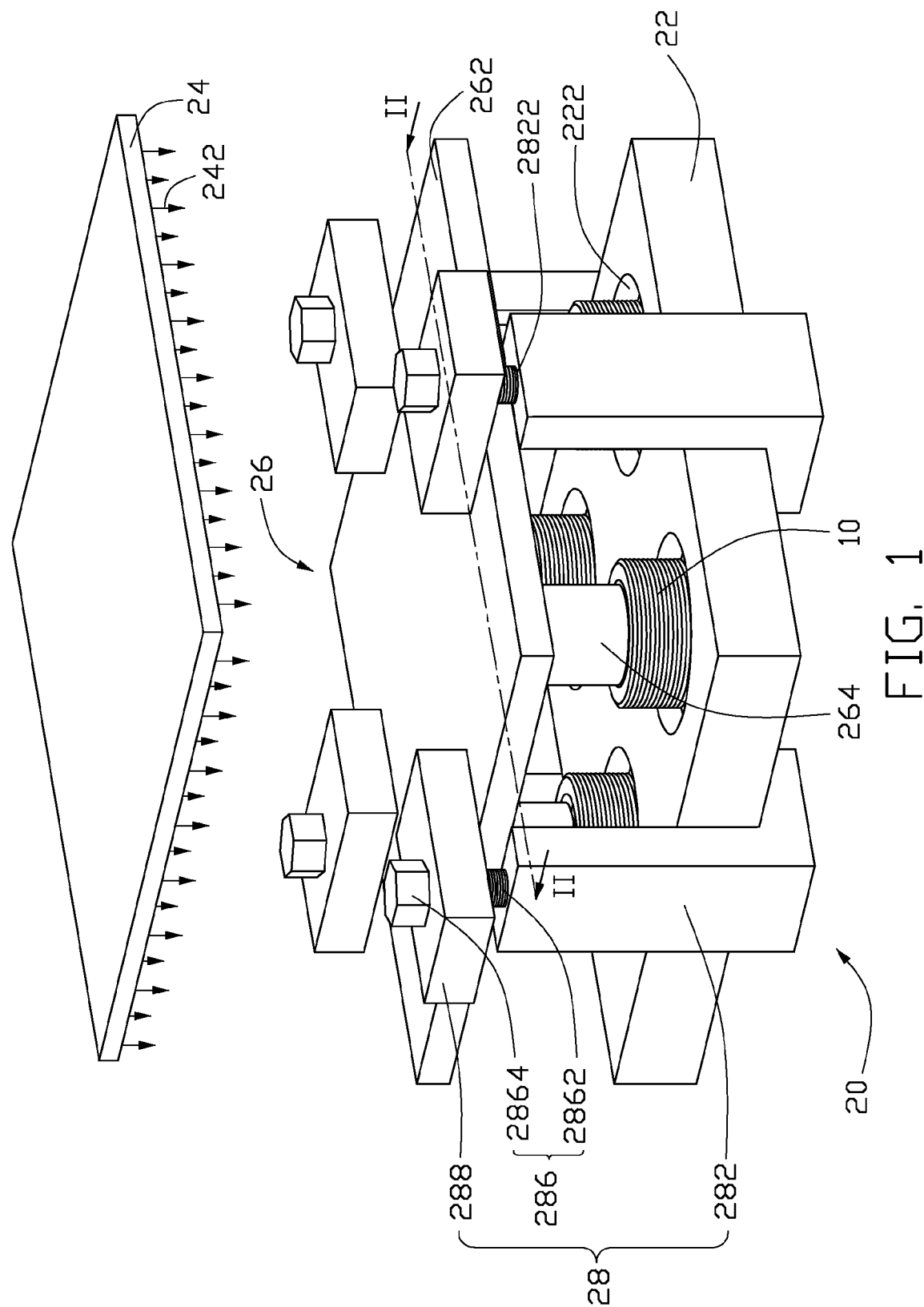
FIG. 1 is a schematic, perspective view of an apparatus for assembling lens modules in accordance with a first embodiment.
Figure 2:
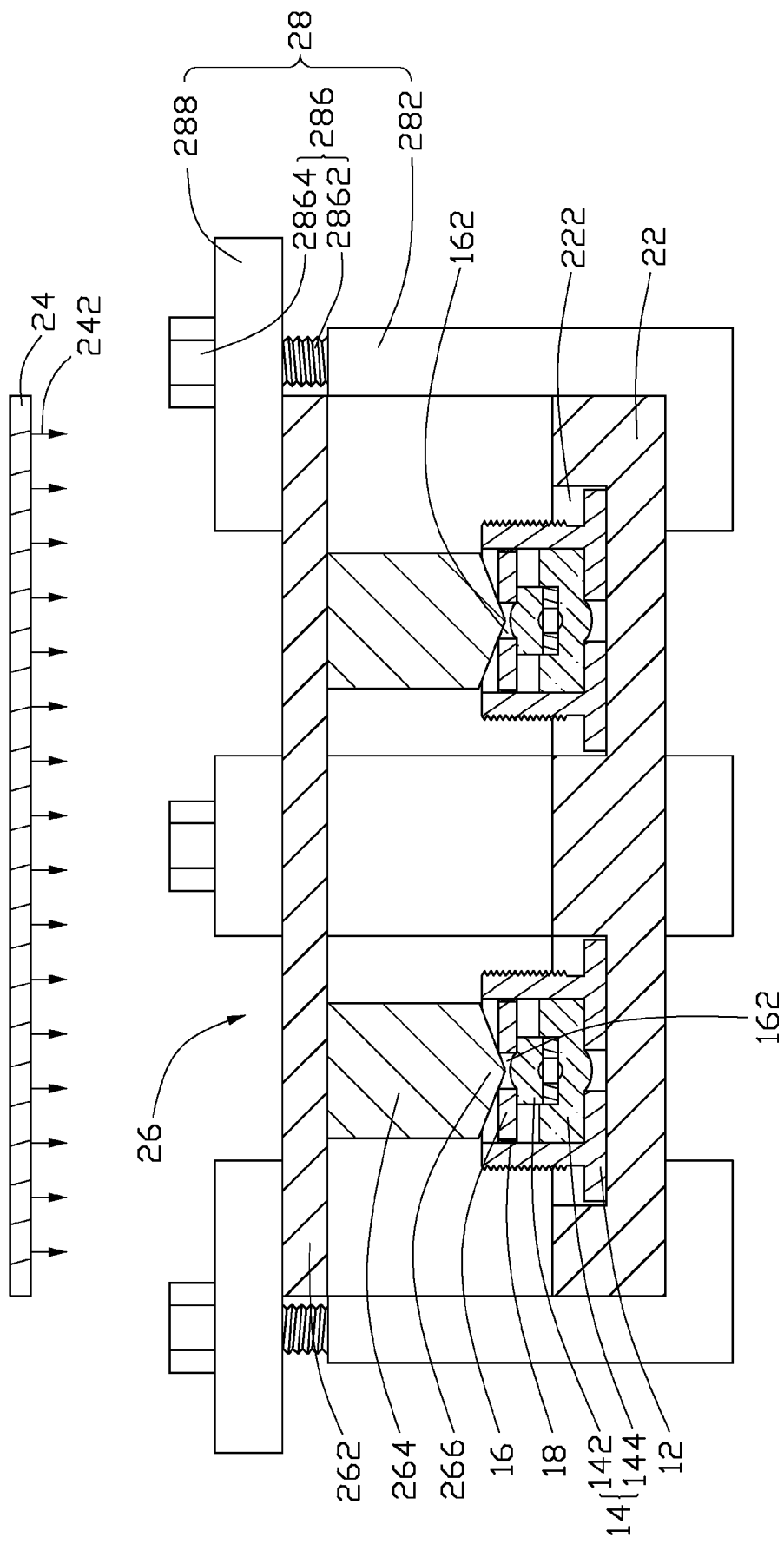
FIG. 2 is a sectional view along line II-II of FIG. 1.

Referring to FIGS. 1 to 2, an apparatus 20 for assembling a number of lens modules in accordance with a first embodiment is shown. Each of the lens modules 10 is a semi-finished product and includes a lens barrel 12 having a principal axis (not shown), a lens group 14 and a spacer 16 received in the lens barrel 12. In this embodiment, the lens group 14 includes two optical lenses 142 and 144 arranged coaxially with the principal axis of the lens barrel 12. The spacer 16 is in the shape of a plate with a through hole 162 defined therein. The through hole 162 of the spacer 16 and the optical lens 142 are coaxially aligned. The spacer 16 is adhered to the inner surface of the lens barrel 12 via UV curable adhesive 18. It is to be understood that the lens group 14 does not necessarily have to be composed of two optical lenses, as more or less lenses may be employed according to practical need.

The apparatus 20 includes a tray 22, a UV light source 24 and a pressing device 26. The tray 22 includes a number of receptacles 222 for receiving respective lens modules 10 therein. Advantageously, the receptacles 222 are regularly defined in an array. In this embodiment, the tray 22 includes four receptacles 222.

The UV light source 24 is configured for emitting UV light 242 to cure the UV curable adhesive 18, thus the spacer 16 is fixed to the inner surface of the lens barrel 12. The pressing device 26 includes a UV light permeable plate 262 and a number of pressing posts 264 substantially extending perpendicularly from the UV light permeable plate 262. The pressing posts 264 are arranged corresponding to respective receptacles 222 of the tray 22. A material of the UV light permeable plate 262 can be selected from organic material, glass, etc. Preferably, a material of the UV light permeable plate 262 is acrylic material. A material of the pressing post 264 can be selected from copper, iron, stainless steel, plastic and etc. Each pressing post 264 is configured for pressing the spacer 264 of the corresponding lens module 10. Each of the pressing posts 264 is cylindrical-shaped and has a cone-shaped end 266 distal from the UV light permeable plate 262. The cone-shaped end 266 is configured for partially inserting into the through hole 162. An outside diameter of the pressing post 264 is less than an inside diameter of the lens barrel 12. Therefore, a gap exists between the pressing post 264 and the corresponding lens barrel 12. The gap allows the UV light 242 emitted from the UV light source 24 to enter into the lens barrel 12 to irradiate the UV curable adhesive 18.

The apparatus 20 includes a number of adjusting clamps 28. The adjusting clamps 28 are configured for clamping the pressing device 26 and the tray 22, and adjusting pressure of pressing post 264 applying onto the spacer 16. Each of the adjusting clamps 28 includes a first clamping jaw 282, a bolt 286 and a second clamping jaw 288. The first clamping jaw 282 is L-shaped. The bolt 286 includes a stud 2862 and a screw cap 2864, and is assembled on one end of the first clamping jaw 282. The second clamping jaw 288 is plate-shaped and defines a through hole therein (not shown). A screw hole 2822 is defined in an end of the first clamping jaw 282 close to the second clamping jaw 288. The stub 2862 extends through the second clamping jaw 288 and is screwed into the screw hole 2822.

In use, the lens modules 10 are received in respective receptacles 222 and the pressing posts 264 of the pressing device 26 press the spacers 16 of the lens modules 10. The second clamping jaws 288 press the UV light permeable plate 262. The second clamping jaws 288 can adjust the pressure on the UV light permeable plate 262 by adjusting a length of the stub 2862 screwing in the screw hole 2822.

In this embodiment, the pressing device 26 presses the spacer 16 when the UV light source 24 irradiates the UV curable adhesive 18 between the inside surface of the lens barrel 12 and the spacer 16. Thus, the pressing device 26 can be used to prevent movement of the spacer 16 relative to the lens barrel 12 caused by volume expansion of the UV curable adhesive 18 in the curing process.

Figure 3:
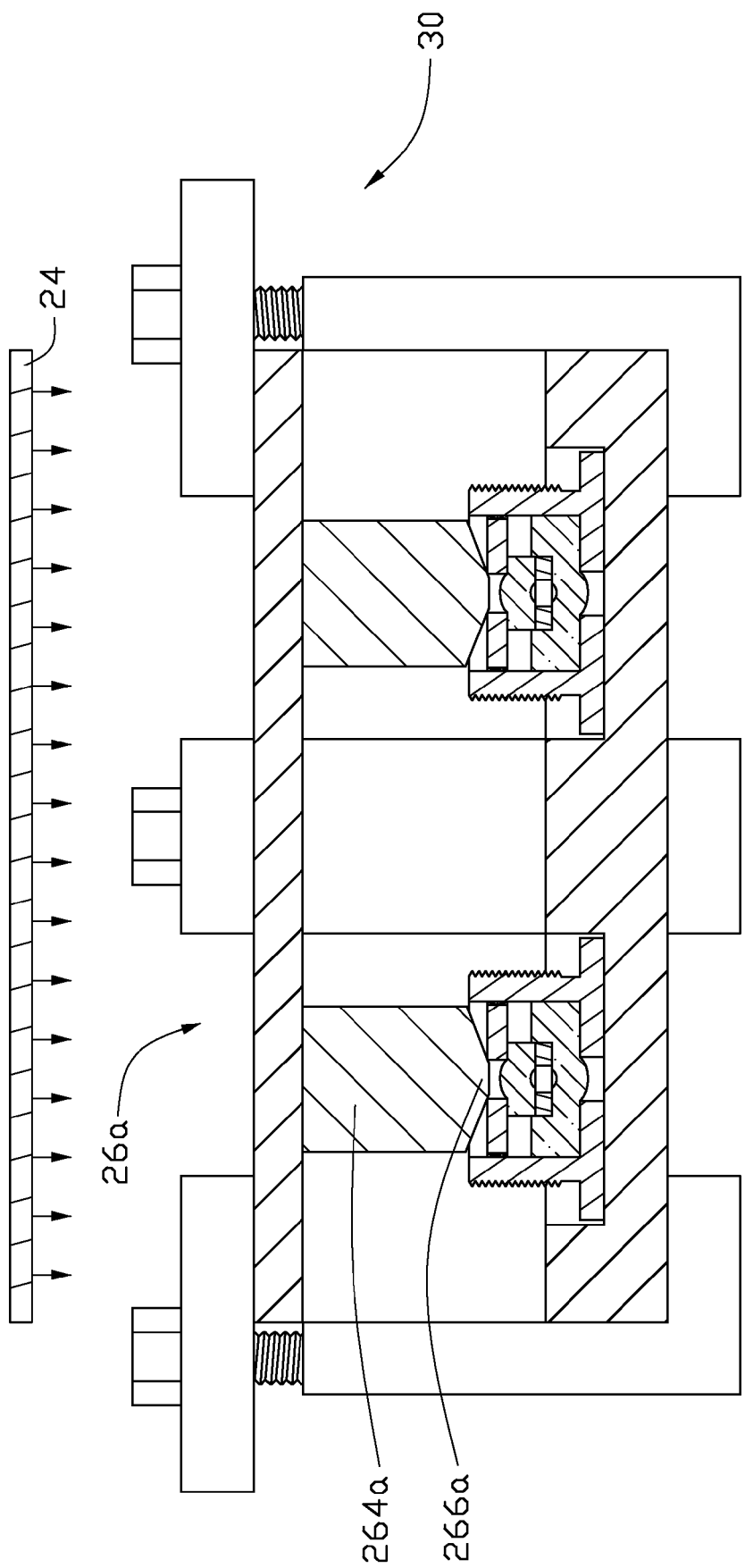
FIG. 3 is schematic, sectional view of an apparatus for assembling lens modules in accordance with a second embodiment.
Figure 4:
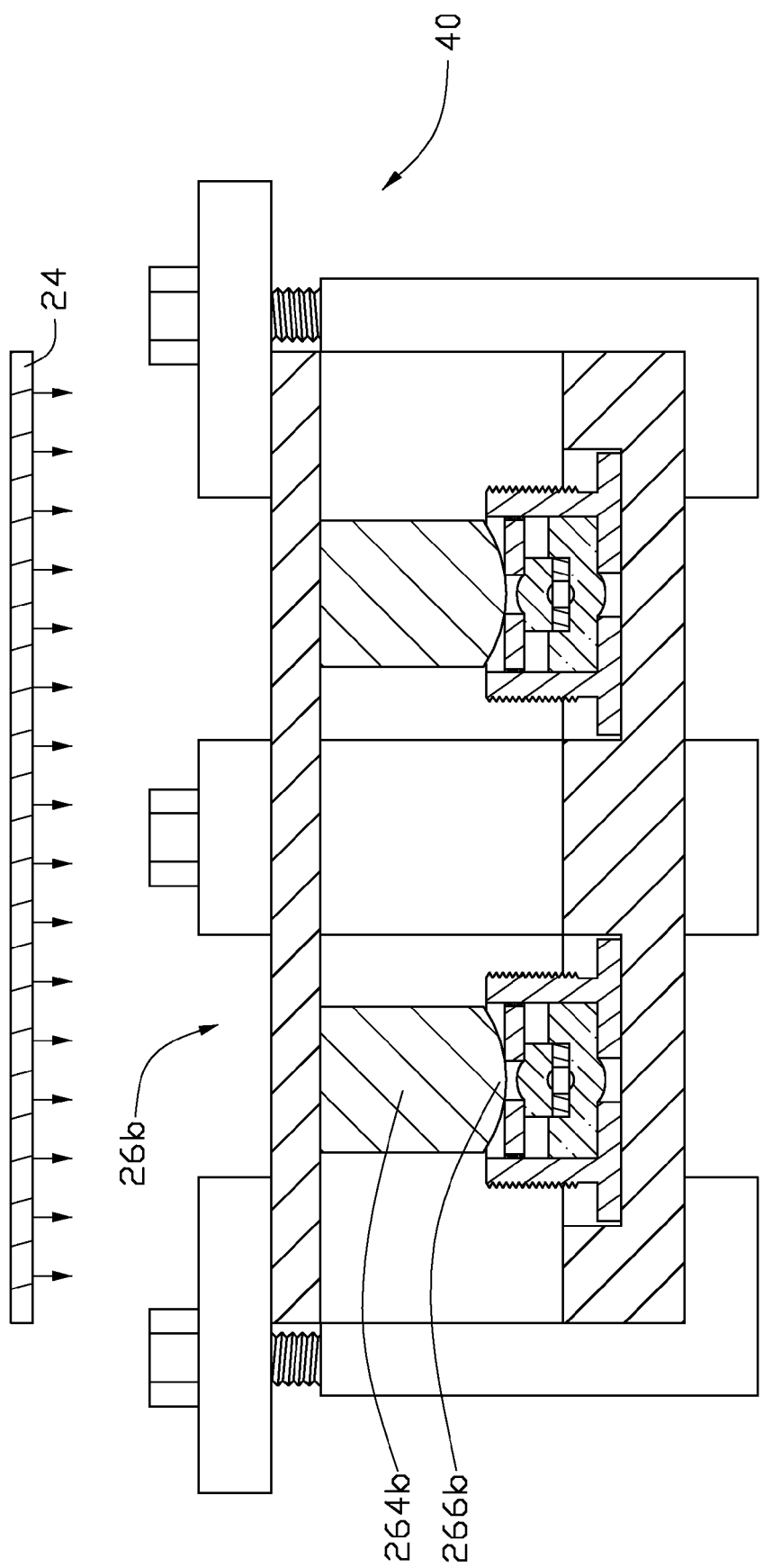
FIG. 4 is schematic, sectional view of an apparatus for assembling lens modules in accordance with a third embodiment.

Referring to FIGS. 3 and 4, apparatuses 30 in accordance with a second embodiment and an apparatuses 40 in accordance with a third embodiment are also configured for assembling the lens modules and illustrated. The two apparatuses 30 and 40 both are similar to the apparatus 20 according to the first embodiment. Referring to FIG. 3, the difference between the apparatus 30 and the apparatus 20 is that the apparatus 30 includes a pressing device 26a comprising a number of pressing posts 264a Each of the pressing posts 264a have a frustoconic end 266a at a distal end thereof. In FIG. 4, the difference between the apparatus 40 and the apparatus 20 is that the apparatus 40 includes a pressing device 26b comprising a number of pressing posts 264b Each of the pressing posts 264b have a sphere end 266b at a distal end thereof.

Figure 5:
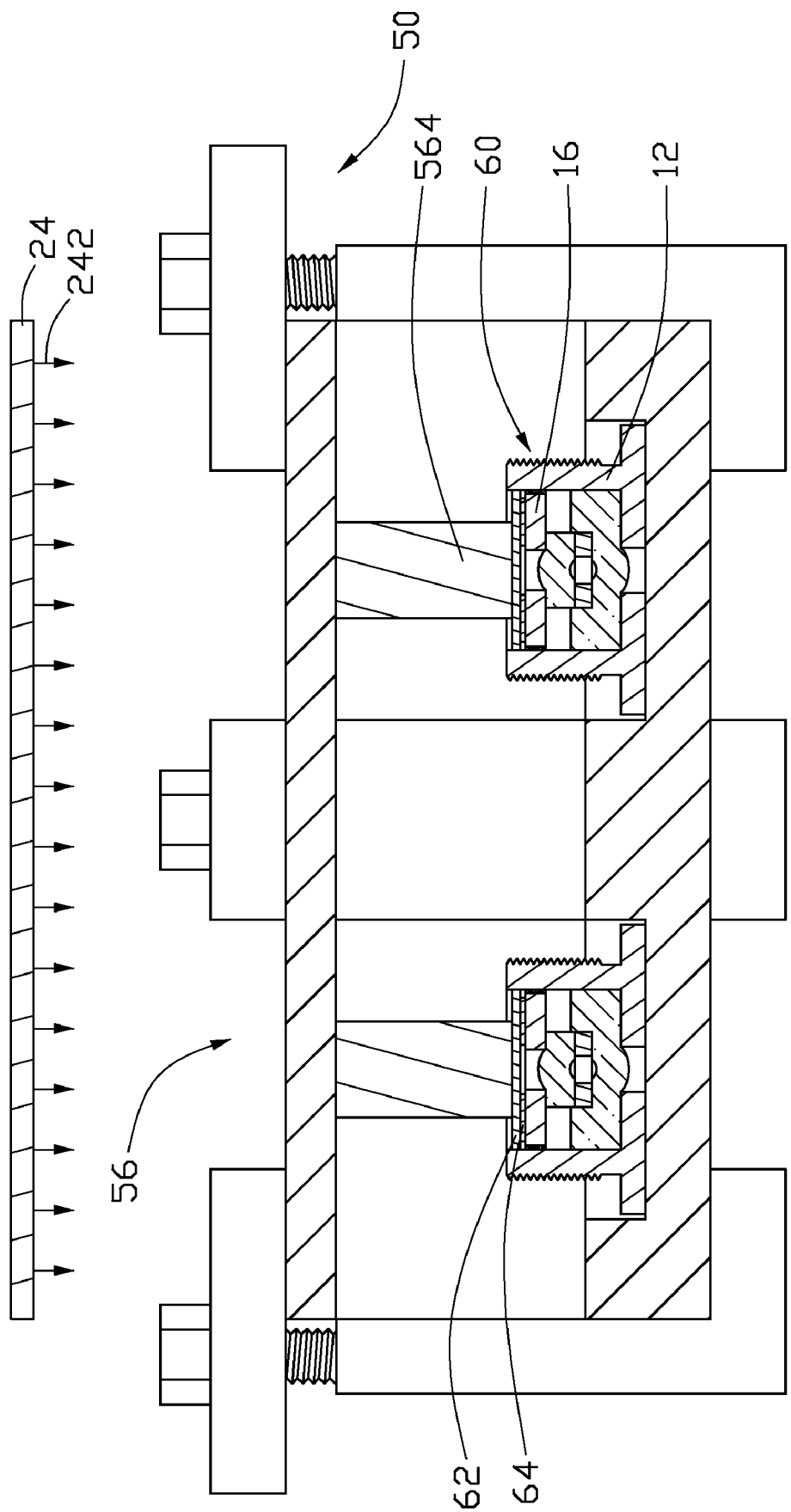
FIG. 5 is schematic, sectional view of an apparatus for assembling lens modules in accordance with a fourth embodiment.

Referring to FIG. 5, an apparatus 50 for assembling lens modules and a group of lens modules 60 disposed in the apparatus 50 are illustrated in accordance with a fourth embodiment. The apparatus 50 is similar to the apparatus 20 according to the first embodiment and the difference is that the apparatus 50 includes a pressing device 56 comprising a number of pressing posts 564 with a plane end face. Differing from the lens module 10 in the first embodiment, the lens module 60 further includes an IR-cut filter 62 arranged on the surface of the spacer 16. The IR-cut filter 62 is fixed to the surface of the spacer 16 by UV curable adhesive 64. Each of the pressing posts 564 are configured for pressing the IR-cut filter 62 when the UV curable adhesive 64 is cured by UV light emitted from the UV light source 24. Considering smoothness of a surface of the IR-cut filter 62, a material of the pressing post 564 may be selected from Teflon (polytetrafluoroethylene, PTFE for short) and other materials with soft texture. Certainly, the pressing device 56 in this embodiment also can be used for pressing the spacer 16 in the first embodiment, and the pressing device 26a and 26b in the second and third embodiments also can be used for pressing the IR-cut filter 62 in this embodiment.

In this embodiment, the pressing device 56 presses the IR-cut filter 62 against the spacer 16 when the UV light source 24 irradiates the UV curable adhesive 64 between the IR-cut filter 62 and the spacer 16. Therefore, the pressing device 56 can be used to prevent inclination of the IR-cut filter 62 relative to the spacer 16 as caused by volume expansion of the UV curable adhesive 64 in the curing process.

It is to be understood that the pressing devices 26, 26a, 26b and 56 also can be used for pressing other components in the lens module 10 as soon as curing UV curable adhesive is needed.

Referring to FIGS. 2 and 5, an method for assembling the lens module 60 is illustrated in accordance with the fifth embodiment. The assembling method includes steps:

Step 1: providing a semi-finished lens module, the semi-finished lens module having a spacer, a lens barrel and UV curable adhesive applied between the inner surface of the barrel and the outer surface of the spacer;

Step 2: pressing the spacer against the barrel; and

Step 3: applying a UV light irradiation onto the UV curable adhesive so as to fix the spacer to the lens barrel;

Step 4: applying UV curable adhesive onto a top surface of the spacer;

Step 5: placing an IR-cut filter on the spacer with the UV curable adhesive sandwiched between the IR-cut filter and the spacer;

Step 6: pressing the IR-cut filter against the spacer; and

Step 7: irradiating the UV light toward the UV curable adhesive so as to cure the UV curable adhesive between the spacer and the IR-cut filter, thus the IR-cut filter being fixed to the spacer.

In step 1, a number of lens modules 10 received in the tray 22 is provided. Each lens module 10 includes a lens barrel 12 and a spacer 16 received in the lens barrel 12. UV curable adhesive 18 is applied between the inner surface of the barrel 12 and the outer surface of the spacer 16.

In step 2, the pressing device 26 and the adjusting clamps 28 are provided. The spacers 16 are pressed by the pressing posts 264 of the pressing device 26 correspondingly. The tray 22 and the UV light permeable plate 262 of the pressing device 26 are disposed between the first and the second clamping jaws 282 and 288. The pressure of the pressing posts 264 on the spacers 16 can be adjusted via the bolt 286.

In step 3, the UV light source 24 is provided. The UV light 242 emitted from the UV light source 24 irradiates the UV curable adhesive 18 to cure the UV curable adhesive 18 between the lens barrel 12 and the spacer 16. Thus, the spacer 16 is fixed to the lens barrel 12.

In step 4, the pressing device 26 is removed from the spacers 16 and the UV curable adhesive 64 is applied to the top surface of the spacer 16. In step 5, the IR-cut filter 62 is placed on the spacer 16 with the UV curable adhesive 64 sandwiched between the IR-cut filter 62 and the spacer 16.

In step 6, the pressing device 56 is provided and is applied to press the IR-cut filter 62 against the spacer 16. The pressure of the pressing posts 564 on the IR-cut filter 62 is adjusted via the adjusting clamps 28.

In step 7, the UV light 242 emitted from the UV light source 24 irradiates the UV curable adhesive 64 to cure the UV curable adhesive 64 between the IR-cut filter 62 and the spacer 16. Thus, the IR-cut filter 62 is fixed to the spacer 16.

It is to be understood that in the steps of the assembly method according to the present embodiment, the pressing device 26 also can be replaced by the pressing device 26a, 26b or 56. Also, the pressing device 56 also can be replaced by the pressing device 26a, or 26b, and still be within the scope of the present embodiment. Specially, the adjusting clamps 28 can be omitted if the pressure between the pressing device and the component is strong enough without the clamps 28.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for assembling lens modules, the lens modules each having a first component, a second component and ultraviolet (UV) curable adhesive applied between the first and second components, the apparatus comprising:
   a UV light source configured for emitting UV light toward the UV curable adhesive; and
   a pressing device configured for pressing the first components against the second components, wherein the pressing device comprises a UV light permeable plate with a plurality of pressing posts extending substantially perpendicularly therefrom, the pressing posts being configured for respectively pressing the corresponding first components.

2. The apparatus for assembling lens modules as described in claim 1 wherein the pressing device comprises a tray facing toward the UV light permeable plate, the tray comprising a plurality of receptacles for receiving the lens modules, wherein the pressing posts extend toward the respective receptacles for pressing the lens modules received therein.

3. The apparatus for assembling lens modules as described in claim 2, wherein the pressing device comprises a plurality of adjusting clamps each having a first clamping jaw and a second clamping jaw, the UV light permeable plate and the tray being disposed between the first and second clamping jaws.

4. The apparatus for assembling lens modules as described in claim 3, wherein a material of the UV light permeable plate is an organic material or a glass.

5. The apparatus for assembling lens modules as described in claim 4, wherein a material of the UV light permeable plate is an organic material is acrylic material.

6. The apparatus for assembling lens modules as described in claim 1, wherein each of the pressing posts is comprised of a material selected from a group consisting of copper, iron, stainless steel and plastic material.

7. The apparatus for assembling lens modules as described in claim 6, wherein each of the pressing posts is comprised of plastic material.

8. The apparatus for assembling lens modules as described in claim 1, wherein the first component is a spacer, and the second component is a lens barrel, the adhesive being applied between an inner surface of the lens barrel and an outer surface of the spacer.

9. The apparatus for assembling lens modules as described in claim 8, wherein a diameter of each of the pressing posts is less than an inner diameter of the lens barrel.

10. The apparatus for assembling lens modules as described in claim 1, wherein a shape of a distal end of each of the pressing posts is selected from a group consisting of a cone and a frustum of a cone.

11. An apparatus for assembling lens modules, the lens modules each having a first component, a second component and ultraviolet (UV) curable adhesive applied between the first and second components, the apparatus comprising:
    a UV light source configured for emitting UV light toward the UV curable adhesive;
    a UV light permeable plate with a plurality of pressing posts extending perpendicularly therefrom, the pressing posts being configured for pressing the first components against the second components;
    a tray facing toward the UV light permeable plate, the tray comprising a plurality of receptacles for receiving the lens modules, the pressing posts extending toward and aligned with the respective receptacles for pressing the lens modules received therein; and
    a plurality of adjusting clamps each having a first clamping jaw and a second clamping jaw, the UV light permeable plate and the tray being disposed between the first and second clamping jaws, the adjusting clamps being configured for adjusting a distance between the pressing posts and the tray.

* * * * *